US012683942B2

(12) United States Patent
Lyman et al.

(10) Patent No.: US 12,683,942 B2
(45) Date of Patent: Jul. 14, 2026

(54) SYSTEMS AND METHODS FOR LOCATION-BASED DEVICE SECURITY

(71) Applicant: PAYPAL, INC., San Jose, CA (US)

(72) Inventors: Nate L. Lyman, Livermore, CA (US);
Roy L. Camp, Cupertino, CA (US);
Eric J. Farraro, San Jose, CA (US);
John R. Tapley, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 126 days.

(21) Appl. No.: 18/737,152

(22) Filed: Jun. 7, 2024

(65) Prior Publication Data

US 2024/0406158 A1 Dec. 5, 2024

Related U.S. Application Data

(63) Continuation of application No. 17/210,304, filed on Mar. 23, 2021, now Pat. No. 12,041,040, which is a
(Continued)

(51) Int. Cl.
*H04L 9/40* (2022.01)
*H04W 4/029* (2018.01)
(Continued)

(52) U.S. Cl.
CPC ............ *H04L 63/08* (2013.01); *H04L 63/102* (2013.01); *H04L 63/107* (2013.01); *H04L 63/20* (2013.01);
(Continued)

(58) Field of Classification Search
CPC ..... H04L 63/08; H04L 63/102; H04L 63/107; H04L 63/20; H04L 41/28; H04W 4/029;
(Continued)

(56) References Cited

U.S. PATENT DOCUMENTS

| | | | |
|---|---|---|---|
| 8,302,152 | B1 | 10/2012 | Hewinson |
| 9,160,729 | B2 | 10/2015 | Lyman et al. |

(Continued)

FOREIGN PATENT DOCUMENTS

| | | |
|---|---|---|
| CN | 103139705 A | 6/2013 |
| JP | 2001306173 A | 11/2001 |

(Continued)

OTHER PUBLICATIONS

US 8,229,463 B2, 07/2012, Ferren et al. (withdrawn)
(Continued)

*Primary Examiner* — Javier O Guzman
(74) *Attorney, Agent, or Firm* — HAYNES AND BOONE, LLP

(57) ABSTRACT

A device may collect environmental information surrounding the device. Based on the collected environmental information, the device may automatically identify a potentially secured location that has lower security risk. When a potentially secured location is identified, the device may prompt the user to setup a security profile having reduced security requirement for the secured location. The device may store and associate the security profile with the secured location. The device may activate the security profile with reduced security requirement when the device is in the secured area. Further, the security profile may require that certain features of the device be disabled when the device is in the secured location.

20 Claims, 4 Drawing Sheets

Related U.S. Application Data continuation of application No. 16/269,857, filed on Feb. 7, 2019, now Pat. No. 10,958,635, which is a continuation of application No. 15/785,395, filed on Oct. 16, 2017, now Pat. No. 10,243,944, which is a continuation of application No. 14/881,094, filed on Oct. 12, 2015, now Pat. No. 9,794,243, which is a continuation of application No. 13/971,717, filed on Aug. 20, 2013, now Pat. No. 9,160,729.

(51) Int. Cl.

| | |
|---|---|
| *H04W 4/80* | (2018.01) |
| *H04W 12/06* | (2021.01) |
| *H04W 12/08* | (2021.01) |
| *H04W 12/64* | (2021.01) |
| *H04W 12/65* | (2021.01) |

(52) U.S. Cl.
CPC ............. *H04W 4/029* (2018.02); *H04W 4/80* (2018.02); *H04W 12/06* (2013.01); *H04W 12/08* (2013.01); *H04W 12/64* (2021.01); *H04W 12/65* (2021.01)

(58) Field of Classification Search
CPC ....... H04W 4/80; H04W 12/06; H04W 12/08; H04W 12/64; H04W 12/65; H04W 4/02
See application file for complete search history.

(56) References Cited

U.S. PATENT DOCUMENTS

| | | | |
|---|---|---|---|
| 9,609,577 | B1 | 3/2017 | Ramalingam et al. |
| 9,794,243 | B2 | 10/2017 | Lyman et al. |
| 10,025,919 | B2 | 7/2018 | Todasco et al. |
| 10,848,969 | B2 * | 11/2020 | Chen ..................... H04W 12/06 |
| 2003/0140246 | A1 | 7/2003 | Kammer et al. |
| 2009/0249460 | A1 | 10/2009 | Fitzgerald et al. |
| 2010/0048167 | A1 | 2/2010 | Chow et al. |
| 2010/0069035 | A1 | 3/2010 | Johnson |
| 2011/0296440 | A1 | 12/2011 | Laurich et al. |
| 2012/0185910 | A1 | 7/2012 | Miettinen et al. |
| 2012/0304310 | A1 | 11/2012 | Blaisdell |
| 2013/0055361 | A1 * | 2/2013 | Walsh ..................... G06F 21/31 726/5 |
| 2013/0070744 | A1 | 3/2013 | Baek et al. |
| 2013/0091452 | A1 * | 4/2013 | Sorden ................... G06F 30/20 715/771 |
| 2013/0124346 | A1 * | 5/2013 | Baldwin ............ G06Q 20/4015 705/16 |
| 2013/0219454 | A1 | 8/2013 | Hewinson |
| 2013/0282589 | A1 * | 10/2013 | Shoup ..................... G06F 21/34 726/5 |
| 2014/0214688 | A1 | 7/2014 | Weiner et al. |
| 2014/0250511 | A1 | 9/2014 | Kendall |
| 2014/0282877 | A1 | 9/2014 | Mahaffey et al. |
| 2014/0289833 | A1 | 9/2014 | Briceno et al. |
| 2014/0337221 | A1 | 11/2014 | Hoyos |
| 2014/0337930 | A1 | 11/2014 | Hoyos et al. |
| 2014/0366128 | A1 * | 12/2014 | Venkateswaran ..... H04W 12/30 726/19 |
| 2015/0026796 | A1 * | 1/2015 | Alan ........................ G06F 21/31 726/19 |
| 2015/0058941 | A1 | 2/2015 | Lyman et al. |
| 2015/0281252 | A1 | 10/2015 | Melcher et al. |
| 2015/0287018 | A1 * | 10/2015 | Iqbal ..................... H04W 12/06 705/44 |
| 2015/0381633 | A1 | 12/2015 | Grim et al. |
| 2016/0036799 | A1 | 2/2016 | Lyman et al. |
| 2016/0337863 | A1 * | 11/2016 | Robinson .............. H04W 4/021 |
| 2018/0103025 | A1 | 4/2018 | Lyman et al. |

FOREIGN PATENT DOCUMENTS

| | | |
|---|---|---|
| JP | 2004118456 A | 4/2004 |
| JP | 2005173805 A | 6/2005 |
| JP | 2006033852 A | 2/2006 |
| JP | 2013025391 A | 2/2013 |
| KR | 20120125381 A | 11/2012 |

OTHER PUBLICATIONS

Bakar K.A.A., et al., "Adaptive Authentication: Issues and Challenges", 2013, IEEE, pp. 1-6.
European Appl. No. 14838606.3, Extended European Search Report mailed Jan. 5, 2017, 7 pages.
European Appl. No. 14838606.3, Office Action mailed Feb. 22, 2019, 5 pages.
International Appl. No. PCT/US2014/051051, International Search Report and Written Opinion mailed Dec. 8, 2014, 6 pages.
International Preliminary Report on Patentability for Application No. PCT/US2014/051051, mailed on Mar. 3, 2016, 6 pages.
Jakobsson M., et al., "Solutions to the Problem," John Wiley Sons, Inc., 2012, pp. 245-329.
Jakobsson M., et al., "The Death of the Internet", 2012, First Edition, Chapter 7, Published by John Wiley Sons, Inc, pp. 245-329.
U.S. Pat. No. 8,229,463, issued on Jul. 24, 2012, Inventor: Ferren et al., (withdrawn).

* cited by examiner

200

300

SYSTEMS AND METHODS FOR LOCATION-BASED DEVICE SECURITY

CROSS REFERENCE TO RELATED APPLICATIONS

This application is a continuation of U.S. patent application Ser. No. 17/210,304, filed Mar. 23, 2021, which is a continuation of U.S. patent application Ser. No. 16/269,857, filed Feb. 7, 2019, now U.S. Pat. No. 10,958,635, issued Mar. 23, 2021, which is a continuation of U.S. patent application Ser. No. 15/785,395, filed Oct. 16, 2017, now U.S. Pat. No. 10,243,944, issued Mar. 26, 2019, which is a continuation of U.S. patent application Ser. No. 14/881,094, filed Oct. 12, 2015, now U.S. Pat. No. 9,794,243, issued Oct. 17, 2017, which is a continuation of U.S. patent application Ser. No. 13/971,717, filed Aug. 20, 2013, now U.S. Pat. No. 9,160,729, issued Oct. 13, 2015, which are incorporated herein by reference in their entirety.

BACKGROUND

Field of the Invention

The present invention generally relates to systems and methods for implementing location-based security for devices.

Related Art

With the proliferation of internet commerce, online security has become a main concern for many internet users. Conventional user login name and password may no longer be adequate to provide security. Many online services now require additional security features, such as security questions, additional pass phrases, images, and etc. Further, additional security also is being added to computers and mobile devices, because users increasingly utilize these devices to conduct online business transactions. The need for additional security results in stricter authentication requirement when accessing the online services or devices used for the online services. For example, a user may be required to enter multiple passwords or passphrases to be granted access to a device or an online service. As such, it becomes increasingly tedious for a user to gain access to a device or an online service. Therefore, there is a need for a system or method that allows a user to easily gain access to a device or an online service when the user is in a secured location, in which excess security requirement are not needed.

Figure 1:
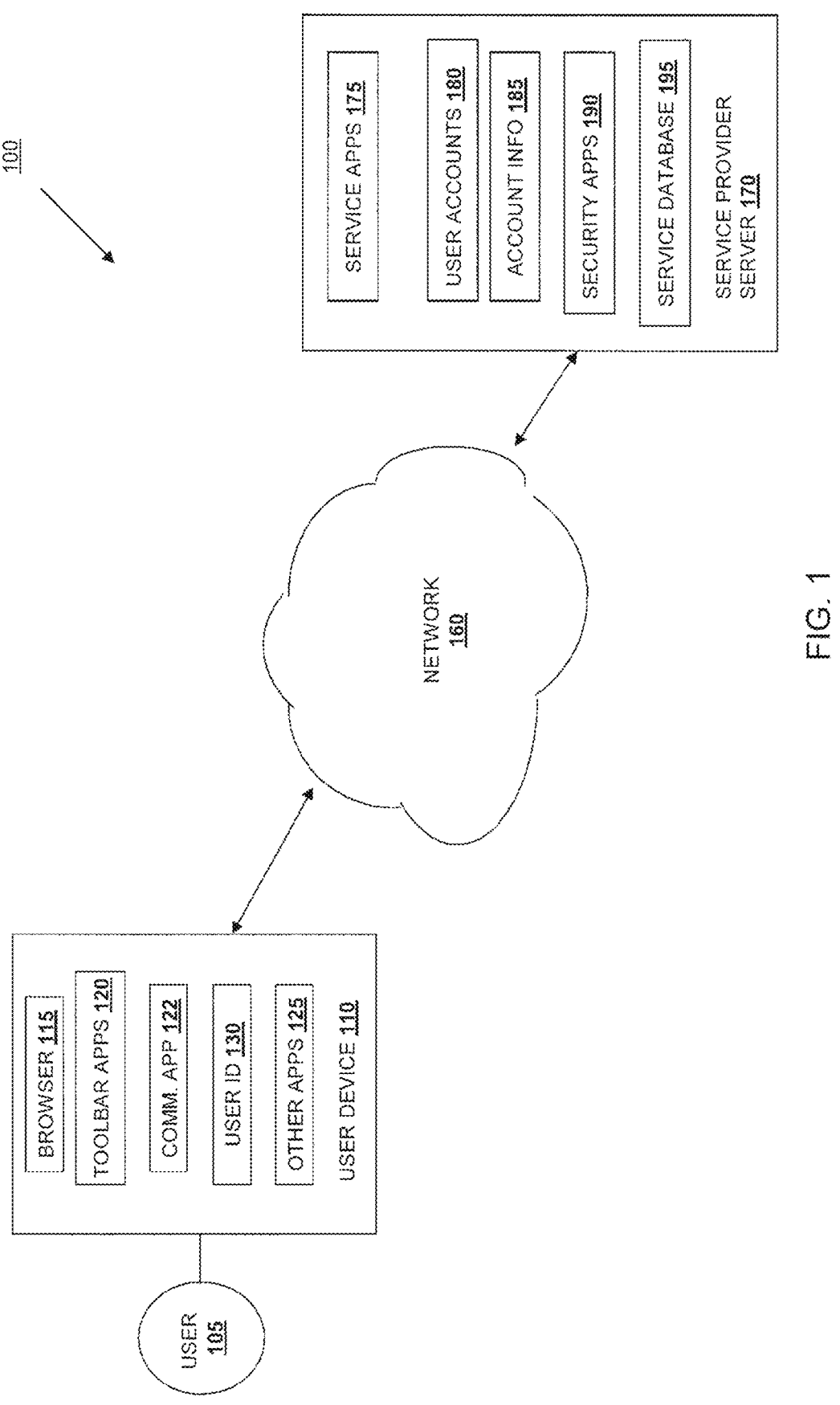
FIG. 1 is block diagram of a networked system suitable for implementing a process for location-based device security according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

According to an embodiment, when a device enters an environment with lower security risk, the device may prompt a user to designate the environment to be a secured location. For example, the secured location may be frequented locations, such as home or work. If the user designates the environment as a secured location, the device may associate a security profile having reduced security requirement with the secured location. For example, the reduced security requirement may require less or no passwords during access authentication for the device. The device may activate the security profile with reduced security requirement when the device is in the secured area.

According to one embodiment, the security profile may require that certain features of the device be disabled when the device is in the secured location. For example, texting features of a mobile phone may be disabled when the mobile phone is in a moving vehicle. Thus, the moving vehicle may be a secured location, in which no texting messages are received or transmitted by the mobile phone.

FIG. 1 is a block diagram of a networked system 100 configured to facilitate a process for location-based device security in accordance with an embodiment of the invention. Networked system 100 may comprise or implement a plurality of servers and/or software components that operate to perform various payment transactions or processes. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

System 100 may include a user device 110 and a service provider server 170 in communication over a network 160. Service provider server 170 may be maintained by an online service provider, such as PayPal, Inc. of San Jose, CA. A user 105, such as a sender or consumer, utilizes user device 110 to conduct business using service provider server 170. For example, a user 105 may utilize user device 110 to initiate a payment transaction, receive a transaction approval request, or reply to the request. Note that transaction, as used herein, refers to any suitable action performed using the user device, including payments, transfer of information, display of information, etc.

User device 110 and service provider server 170 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160.

Network 160 may be implemented as a single network or a combination of multiple networks. For example, in various embodiments, network 160 may include the Internet or one or more intranets, landline networks, wireless networks, and/or other appropriate types of networks.

User device 110 may be implemented using any appropriate hardware and software configured for wired and/or wireless communication over network 160. For example, in one embodiment, the user device may be implemented as a personal computer (PC), a smart phone, personal digital assistant (PDA), laptop computer, and/or other types of computing devices capable of transmitting and/or receiving data, such as an iPad™ from Apple™.

User device 110 may include one or more browser applications 115 which may be used, for example, to provide a convenient interface to permit user 105 to browse information available over network 160. For example, in one embodiment, browser application 115 may be implemented as a web browser configured to view information available over the Internet, such as a user account for setting up a gift list and/or merchant sites for viewing and purchasing gifts. User device 110 may also include one or more toolbar applications 120 which may be used, for example, to provide client-side processing for performing desired tasks in response to operations selected by user 105. In one embodiment, toolbar application 120 may display a user interface in connection with browser application 115.

User device 110 may further include other applications 125 as may be desired in particular embodiments to provide desired features to user device 110. For example, other applications 125 may include security applications for implementing client-side security features, programmatic client applications for interfacing with appropriate application programming interfaces (APIs) over network 160, or other types of applications.

Applications 125 may also include email, texting, voice and IM applications that allow user 105 to send and receive emails, calls, and texts through network 160, as well as applications that enable the user to communicate, transfer information, make payments, and otherwise utilize a smart wallet through the payment provider as discussed above. User device 110 includes one or more user identifiers 130 which may be implemented, for example, as operating system registry entries, cookies associated with browser application 115, identifiers associated with hardware of user device 110, or other appropriate identifiers, such as used for payment/user/device authentication. In one embodiment, user identifier 130 may be used by a payment service provider to associate user 105 with a particular account maintained by the payment provider. A communications application 122, with associated interfaces, enables user device 110 to communicate within system 100.

User device 110 may include applications for collecting environmental data, such as geo-location data via Global Positioning System (GPS), temperature data, altitude data, humidity data, data regarding device movement, ambient sound data, imaging data via a camera, and etc. Further, geo-fencing technology may be used to set up boundaries to define a location. User device 110 may detect signals from devices that implement geo-fencing technology. These environmental data may be utilized to determine a location or environment in which user device 110 is located.

Service provider server 170 may be maintained, for example, by an online service provider which may provide online service to user 105. In this regard, service provider server 170 includes one or more service applications 175 which may be configured to interact with user device 110 over network 160 to facilitate the services and communicate/display information at user device 110. For example, service provider server 170 may provide services, such as payment transaction, banking, retail shopping, and etc.

Service provider server 170 also maintains a plurality of user accounts 180, each of which may include account information 185 associated with users. For example, account information 185 may include private financial information of users of devices such as account numbers, passwords, device identifiers, user names, phone numbers, credit card information, bank information, or other financial information which may be used to facilitate online transactions by user 105. Account information 185 may also include security profiles for users or user devices.

Security applications 190, which may be part of service application 175 or separate, may be configured to receive security information from a user device for processing and storage in a service database 195. Security applications 190 may include one or more applications to process and manage security information from user 105 and. As such, security applications 190 may store details of security profiles from users or user devices, associated secured locations, and etc. Service application 175 may be further configured to determine the existence of and to manage accounts for user 105, as well as create new accounts if necessary, such as the set up and management user accounts.

Figure 2:
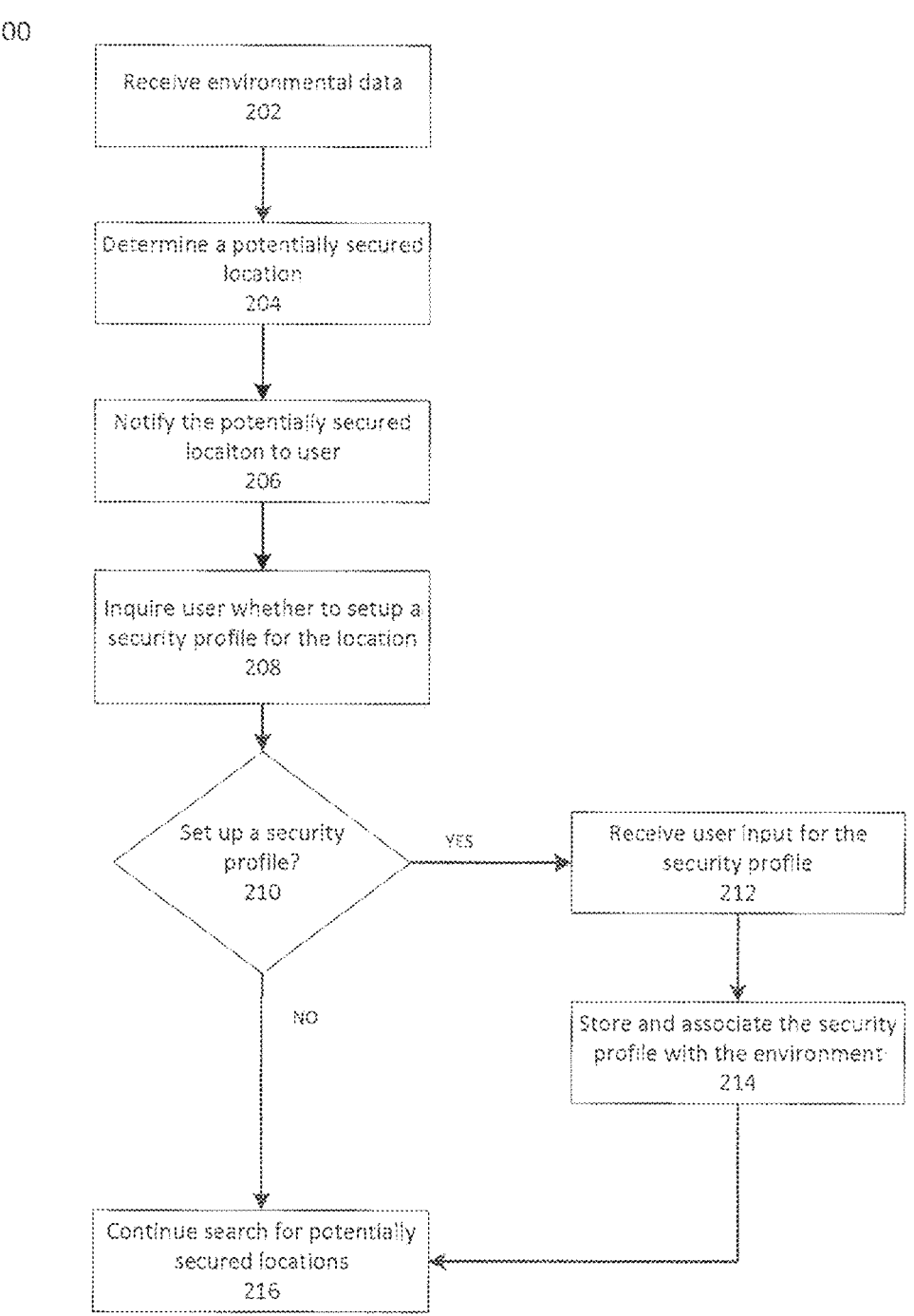
FIG. 2 is a flowchart showing a process for designating a secured location according to one embodiment.

FIG. 2 is a flowchart showing a process 200 for designating a secured location according to one embodiment. At step 202, user device 110 may detect environmental data. For example, user device 110 may detect WiFi signals, Bluetooth signals, available networks, geographical location via Global Positioning System (GPS), cellular signals, Near-Field Communication (NFC) signals, and etc. Further, user device 110 may detect date and time, device movement, ambient sound/noise, temperature, humidity, ambient light, and etc. User device 110 may detect and collect these environmental data for determining an environmental condition or a location of user device 110. User device 110 may store the environmental data in a historical log. Thus, a historical environmental data may be stored at user device 110. In an embodiment, user device 110 may send the environmental data to service provider server 170 to be stored at service provider server 170.

At step 204, user device 110 may determine whether user device 110 is in a potentially secured location using the detected environmental data. In one embodiment, user device 110 may send the detected environmental data to service provider server 170. Service provider server 170 may receive the environmental data from user device 110 and may determine whether user device 110 is in a potentially secured location based on the environmental data. A familiar location, at which user device 110 had previously been accessed multiple times, such as at home or at work, may be a potentially secured location. For example, user device 110 may detect a wireless or wired network at home or at work and may determine that user device 110 had been accessed multiple times before in the area of the wireless or wired network based on the historical environmental data. Thus, user device 110 may determine that location of home or work where the same wireless or wired network is detected may be a potentially secured location. The user may also designate a home or work address as a secured location, such that the service provider determines whether the location of the user device is within the user-designated location.

In one embodiment, a potentially secured location may be determined based on the proximity of other devices. For example, user device 110 may detect signals, such as an NFC signal or a Bluetooth, emitted from a user's other peripheral devices, such as a watch, a printer, a laptop, a tablet computer, glasses, other wearable devices, etc. Based on historical environmental data, user device 110 may determine that user device 110 had been accessed multiple times before in the proximity of these peripheral devices. Thus, user device 110 may determine that the proximity of these peripheral devices constitute a potentially secured location. In an embodiment, security requirement for accessing user device 110 may decrease with the increase in the number of the user's other devices that are in proximity of user device 110.

In an embodiment, an administrator of a corporate server may designate particular secured locations for user device 110. For example, geographical locations of company buildings and the employee's resident may be designated as secure locations. Based on the geographical location detected by a GPS sensor, user device 110 may allow access with reduced security requirement at these designated secured locations. Further, other locations, such as hotel locations of a participating hotel chain may be designated by a company as secured locations. Thus, user device 110 may allow access with reduced security requirement at the hotel locations of the participating hotel chain when company employees stay at these hotels for business travel.

In an embodiment, public places, such as a movie theater, hospital, court house, airplane, place of worship, or the like may have a beacon device that broadcasts a signal, such as a WiFi or Bluetooth signal, that signifies a certain security profile for the public place. For example, a beacon device at a movie theater may broadcast a signal for a security profile that restricts phone calls for mobile devices or that turns phone rings to vibrate. Thus, the beacon device may signify a secured location at this public place. User device 110 may detect the beacon signal and may determine that user device 110 is in a potentially secured location.

User device 110 also may use environmental data collected by various sensors, such as movement, sound, ambient light, temperature, and etc. to determine a potentially secured location. For example, if user device 110 detects that user device 110 is moving at a high speed, such as greater than 150 miles per hour (mph), user device 110 may determine that user device 110 is in an airplane during takeoff and may determine that user device 110 should be changed to an airplane mode associated with a security profile that restricts phone calls or texting. User device 110 may suggest to the user to switch user device 110 to the airplane mode.

After a potentially secured location is determined by user device 110 or by service provider server 170 at step 204, a notification may be generated to notify the user that a potentially secured location is detected at step 206. The notification may include a description of the environmental condition used to qualify the potentially secured location. For example, the notification may indicate that two other peripheral devices belonging to the same user are in the proximity of user device as an environmental condition that qualifies for a potentially secured location.

At step 208, a request to designate the location as a secured location may be generated and displayed to the user. For example, a potentially secured location may be a merchant store where user device 110 had been used multiple times to make purchase. A notification may inform the user that multiple purchases had been made using user device 110 at the merchant location and whether the user would like to designate the merchant location as a secured location, such that reduced security requirement may be used for the next purchase.

In another example, user device 110 may detect a beacon signal signifying a movie theater mode when user device 110 enters a movie theater. A notification may be generated and displayed at user device 110 to inform the user that user device 110 appears to be in a movie theater and request whether the user would like to use the movie theater mode for user device 110 to restrict phone calls, switch to vibrate-only mode, or turn off phone rings.

At step 210, user device 110 may receive a user response and determine whether to set up a security profile for the potentially secured location based on the user response. If the user response indicates that no security profile should be set up for the potentially secured location at step 210, user device 110 may continue to search for potentially secured locations at step 216. For example, the process may return to step 202 to continue collecting environmental data. User device 110 may continue to monitor and analyze environmental data to identify other potential secured locations. This process allows the system or user device 110 to continuously learn the user's environment, activities, or habits, and suggest appropriate potentially secured locations to the user.

In an embodiment, if a potentially secured location is not designated as a secured location for the first time, the potentially secured location may be stored or flagged, such that no notification or request to set up security profile is generated the next time user device 110 is enters the same potentially secured location. Thus, after the user refuses to designate a certain potentially secured location for the first time, the user is not notified again when user device 110 enters the certain potentially secured area in the future.

If the user response indicates that a security profile should be set up for the potentially secured location at step 210, user device 110 may receive user input for setting up the security profile at step 212. Various security options, such as reduced passcode, automatic access without authentication, restricted phone use, or etc., may be presented for user's selection. For example, a company building may be a secured location for a company-issued laptop. The user of the company-issued laptop may set up a security profile for the company building such that the company-issued laptop is automatically connected to the company's VPN network without authorization process, e.g., no password or ID input. In another example, the user may set up the security profile, such that texting or phone calls are restricted in a moving vehicle.

In still another example, a location of a coffee shop between 7:00 AM to 9:00 AM on a week day may be designated as a secured location and time, because the user visits the coffee shop every week day morning to purchase a cup of coffee. The user may set up a security profile for this location and time, such that payment transactions using user device 110 at the coffee shop between 7:00 AM and 9:00 AM on a week day require no authentication.

At step 214, user device 110 may store the designated secured location (and time) with the security profile set up by the user. In one embodiment, service provider server 170 may store and associate the designated secured location with the security profile. Thus, when user device 110 visits the designated secured location in the future, an appropriate security profile may automatically be activated for the user's convenience. For example, at a frequently visited merchant, the user may have reduced authentication requirement, e.g., partial passcode, for making a purchase using user device 110.

By using the above process, potentially secured locations may automatically be identified and suggested to a user. The user is allowed to designate a secured location and set up a security profile for the secured location. Thus, appropriate security requirement or restrictions may be implemented for user device 110 based on the time and location of user device 110.

Figure 3:
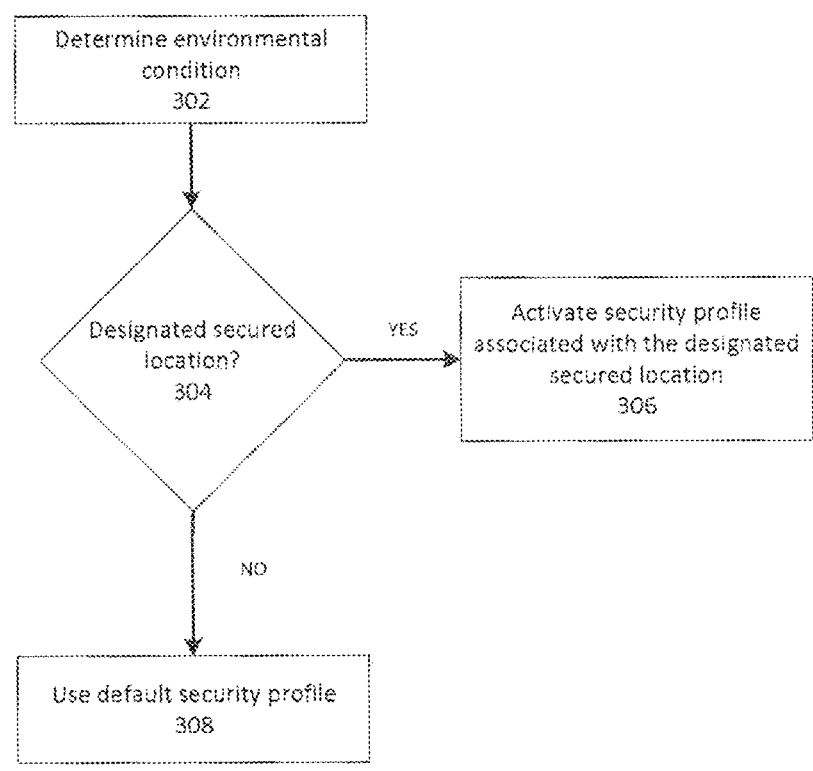
FIG. 3 is a flowchart showing a process for activating a security profile according to one embodiment.

FIG. 3 is a flowchart showing a process for activating a security profile according to one embodiment. At step 302, user device 110 may monitor and collect environmental data. For example, user device 110 may use various communication devices or sensors to detect WiFi signals, Bluetooth signals, NFC signals, GPS location, device movements, temperature, ambient noise, ambient light, and etc.

At step 304, user device 110 or service provider server 170 may determine whether user device 110 is in a designated secured location. For example, profiles of designated secured locations may be stored in user device 110 or service provider server 170. Each profile of designated secured location may include environmental conditions that identify the designated secured location, such as proximity of other devices, geographical location, detection of certain signals, and etc.

When current environmental condition matches that of a designated secured location, user device 110 or service provider server 170 may determine that user device 110 is in the designated secured location at step 304. At step 306, user device 110 may activate the security profile associated with the designated secured location. For example, when a home wireless network is detected, which is an environmental condition for a designated secured location, a security profile associated with the designated secured location may be activated. The security profile for home may be to have automatic full access to all sensitive and private data without authentication. Thus, a user may skip the tedious authentication process when using user device 110 at home.

In an embodiment, service provider server 170 may activate the security profile associated with the designated secured location for services rendered to user device 110. For example, when a user attempts to access a user account at service provider server 170, service provider server 170 may receive, from user device 110, environmental data detected at user device 110 and the identification information for the user account. Service provider server 170 may determine, based on the received environmental data and the designated secured location associated with the user account, whether user device 110 is in a secured location designated by the user. If so, service provider 170 may activate the security profile associated with the designated secured location for user device 110. Service provider server 170 then may generate an authentication request with reduced authentication requirement based on the activated security profile. For example, service provider server 170 may generate an authentication request prompting for the user to enter partial password, e.g., the first three letters of the password, instead of the full password. Service provider server 170 may receive the user's response to the authentication request and determine whether the partial password matches the password stored with the user account at service provider server 170. Thus, the reduced authentication requirement may reduce the user's input required to access the service provider server 170.

When service provider server 170 is a payment service provider and is used to make a purchase via user device 110 at a non-secured location, service provider server 170 may generate an authentication request prompting the user to enter full user ID and password. Further, server provider server 170 may conduct regular fraud analysis for the payment transaction. On the other hand, when the purchase is made at a designated secured location, service provider server 170 may generate an authentication request requiring less or no password. Further, service provider server 170 may conduct a lighter fraud analysis for the payment transaction taking place in a designated secured area.

Examples of reduced authentication requirement may include automatic access to online services or to a Virtual Private Network (VPN). In another example, the user ID and password for authentication may automatically be entered for the user in a designated secured location.

If the detected environmental condition does not match any of the environmental conditions associated with the designated security locations at step 304, user device 110 may use a default security profile at step 308. For example, when user device 110 is at a new geographical location, user device 110 may use the default security profile that requires regular authentication process to access user device 110 or other online services offered at service provider server 170 via user device 110.

In an embodiment, when user device 110 detected that user device 110 is in a new location in which user device 110 has never visited, user device 110 may use a security profile with elevated security. For example, when a user travels to a new state or country and wishes to conduct banking business using service provider sever 170 via user device 110, user device 110 may detect that user device 110 is visiting a new location and service provider server 170 may use a security profile with elevated security requirement, such as additional security questions during user login for the user's banking account.

By using the above processes, potentially secured locations may be identified and notified to the user. The user may be allowed to designate secured locations and set up security profiles for the designated secured locations. The security profiles may be activated automatically when a device enters the designated secured locations. Security and other settings may be adjusted based on the location and environment the device is in. Thus, appropriate security settings may automatically be used for the device to improve user experience.

Figure 4:
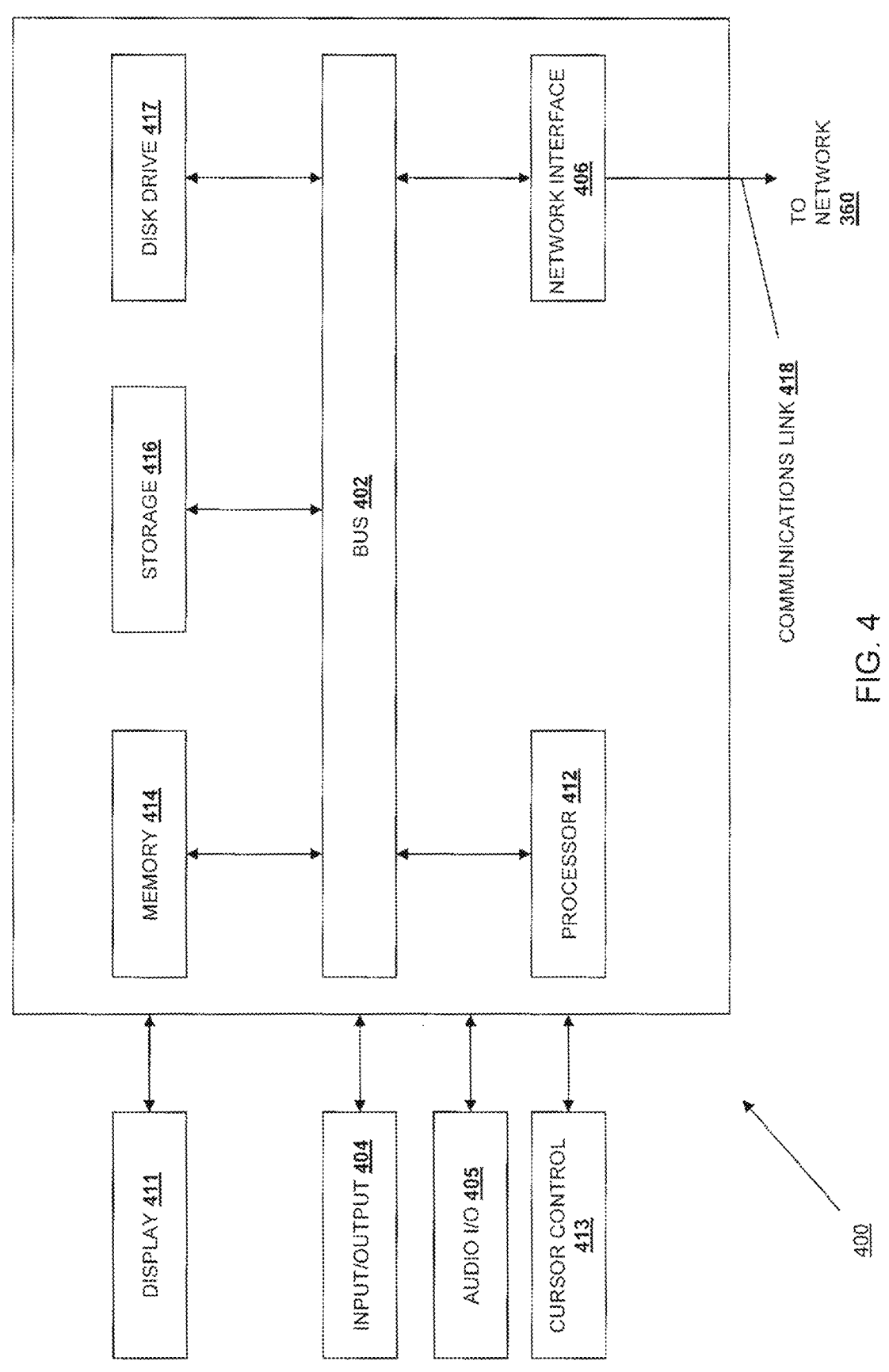
FIG. 4 is a block diagram of a computer system suitable for implementing one or more components in FIG. 1 according to one embodiment.

FIG. 4 is a block diagram of a computer system 400 suitable for implementing one or more embodiments of the present disclosure. In various implementations, the user device may comprise a personal computing device (e.g., smart phone, a computing tablet, a personal computer, laptop, PDA, Bluetooth device, key FOB, badge, etc.) capable of communicating with the network. The merchant and/or payment provider may utilize a network computing device (e.g., a network server) capable of communicating with the network. It should be appreciated that each of the devices utilized by users, merchants, and payment providers may be implemented as computer system 400 in a manner as follows.

Computer system 400 includes a bus 402 or other communication mechanism for communicating information data, signals, and information between various components of computer system 400. Components include an input/output (I/O) component 404 that processes a user action, such as selecting keys from a keypad/keyboard, selecting one or more buttons or links, etc., and sends a corresponding signal to bus 402. I/O component 404 may also include an output component, such as a display 411 and a cursor control 413 (such as a keyboard, keypad, mouse, etc.). An optional audio input/output component 405 may also be included to allow a user to use voice for inputting information by converting audio signals. Audio I/O component 405 may allow the user to hear audio. A transceiver or network interface 406 transmits and receives signals between computer system 400 and other devices, such as another user device, a merchant server, or a payment provider server via network 360. In one embodiment, the transmission is wireless, although other transmission mediums and methods may also be suitable. A processor 412, which can be a micro-controller, digital signal processor (DSP), or other processing component, processes these various signals, such as for display on computer system 400 or transmission to other devices via a communication link 418. Processor 412 may also control transmission of information, such as cookies or IP addresses, to other devices.

Components of computer system 400 also include a system memory component 414 (e.g., RAM), a static storage component 416 (e.g., ROM), and/or a disk drive 417. Computer system 400 performs specific operations by processor 412 and other components by executing one or more sequences of instructions contained in system memory component 414. Logic may be encoded in a computer readable medium, which may refer to any medium that participates in providing instructions to processor 412 for execution. Such a medium may take many forms, including but not limited to, non-volatile media, volatile media, and transmission media. In various implementations, non-volatile media includes optical or magnetic disks, volatile media includes dynamic memory, such as system memory component 414, and transmission media includes coaxial cables, copper wire, and fiber optics, including wires that comprise bus 402. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 400. In various other embodiments of the present disclosure, a plurality of computer systems 400 coupled by communication link 418 to the network (e.g., such as a LAN, WLAN, PTSN, and/or various other wired or wireless networks, including tele-communications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/ or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

The invention claimed is:

1. A method, comprising:

accessing a current location of a user device of a user, wherein the current location is provided by one or more sensors of the user device;

determining that the current location corresponds to a predefined location that is associated with a predefined protocol for operating the user device, the predefined protocol being different from a default protocol for operating the user device;

determining that one or more peripheral devices of the user are in electronic communication with the user device; and facilitating, based on the determining that the current location corresponds to the predefined location and on the determining that the one or more peripheral devices of the user are in electronic communication with the user device, an operation of the user device according to the predefined protocol, wherein a security requirement of the predefined protocol is based on a number of the one or more peripheral devices that are in electronic communication with the user device.

2. The method of claim 1, further comprising, before the accessing: associating the predefined location with the predefined protocol based on a request from the user via the user device.

3. The method of claim 2, further comprising, after the associating: sending a notification to the user device, the notification containing a confirmation of the associating, wherein the predefined protocol is defined by the user of the user device.

4. The method of claim 1, wherein the security requirement of the predefined protocol decreases as the number of the one or more peripheral devices that are in electronic communication with the user device increases.

5. The method of claim 1, wherein:

the default protocol requires an entry of a password for the operation; and the predefined protocol requires no entry or only a partial entry of the password for the operation.

6. The method of claim 1, wherein:

the default protocol requires a manual entry of a username or a password for the operation; and the predefined protocol automatically enters the username or the password for the operation.

7. The method of claim 1, wherein:

the default protocol requires a first level of a fraud risk analysis for the operation; and the predefined protocol requires a second level of the fraud risk analysis for the operation, the second level being less than the first level.

8. The method of claim 1, wherein the predefined protocol comprises a restriction on a capability of the user device to make a telephone call.

9. The method of claim 1, wherein the predefined protocol comprises an automatic implementation of a predefined notification mode when the user device receives an electronic notification.

10. The method of claim 1, wherein the one or more sensors comprise a Global Positioning System (GPS) sensor, a Near Field Communication (NFC) sensor, or a Bluetooth signal sensor, and wherein the operation comprises an electronic transaction with a particular merchant.

11. The method of claim 1, wherein the facilitating is further based on a determination that the user device has been previously accessed a plurality of times at the current location.

12. A system, comprising:

a hardware processor; and a non-transitory computer-readable medium having stored thereon instructions that are executable by the hardware processor to cause the system to perform operations comprising:

receiving location data of a user device of a user, the location data provided by one or more sensors of the user device;

determining that the location data matches a user-specified location that is associated with a first protocol for operating the user device, the first protocol being different from a second protocol under which the user device is operated when the user device is outside the user-specified location;

determining that the user device is within a specified proximity range of one or more peripheral devices of the user; and allowing, based on the determining that the location data matches the user-specified location and on the determining that the user device is within the specified proximity range of the one or more peripheral devices, the user to operate the user device according to the first protocol, wherein a security requirement of the first protocol is correlated with a number of the peripheral devices of the one or more peripheral devices.

13. The system of claim 12, wherein the first protocol has a reduced authentication requirement compared to the second protocol.

14. The system of claim 12, wherein the first protocol is associated with conducting a different level of risk analysis for user-initiated electronic transactions compared to the second protocol.

15. The system of claim 12, wherein the user is allowed to operate the user device without supplying a complete password under the first protocol.

16. The system of claim 12, wherein the determining that the location data matches the user-specified location is based on comparing Global Positioning System (GPS) coordinates contained in the location data with GPS coordinates of the user-specified location.

17. The system of claim 12, wherein the first protocol restricts an ability of the user device to make or receive calls or an ability of the user device to receive an electronic notification.

18. A non-transitory machine-readable medium having stored thereon machine-readable instructions executable to cause a machine to perform operations comprising:

determining that a user device of a user is attempting to conduct a transaction;

accessing a location of the user device provided by one or more location sensors of the user device;

determining that the location of the user device is within a user-specified location;

determining that one or more peripheral devices of the user are currently sending signals to the user device; and implementing, based on the determining that the location of the user device is within a user-specified location and on the determining that the one or more peripheral devices are currently sending signals to the user device, a user-specified security protocol for conducting the transaction, wherein the user-specified security protocol has a reduced user authentication requirement than a first security protocol under which the user device is operated when the user device is outside the user-specified location, and wherein an extent to which the user authentication requirement is reduced is based on a number of the one or more peripheral devices that are currently sending the signals to the user device.

19. The non-transitory machine-readable medium of claim 18, wherein the reduced user authentication requirement allows the transaction to be conducted without requiring the user to enter a password.

20. The non-transitory machine-readable medium of claim 18, wherein the operations further comprise:

prompting the user to designate the location as the user-specified location after determining that the user has conducted the transaction at the location a number of times above a threshold.

* * * * *